Nov. 3, 1925.
G. W. HAMAN
1,559,611
DIRIGIBLE SPOTLIGHT BRACKET
Filed Jan. 30, 1924
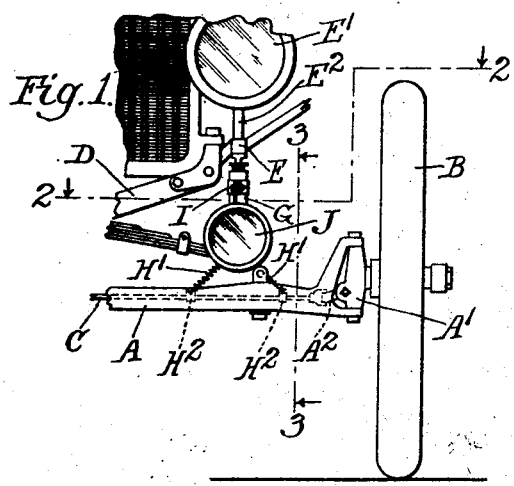
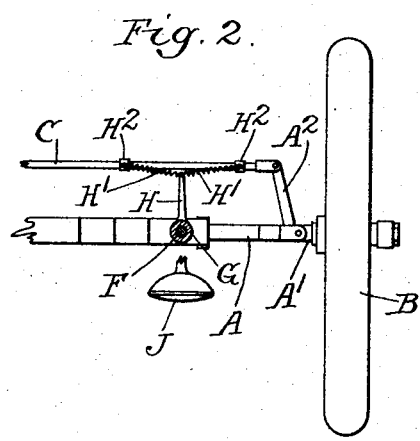
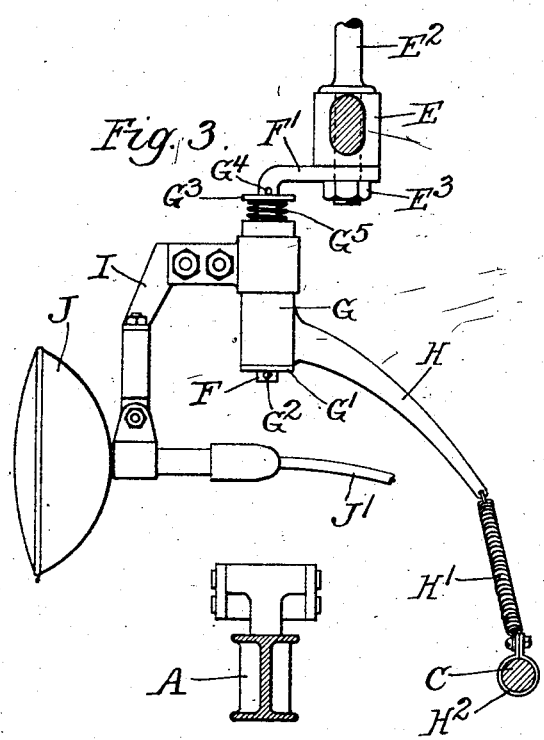
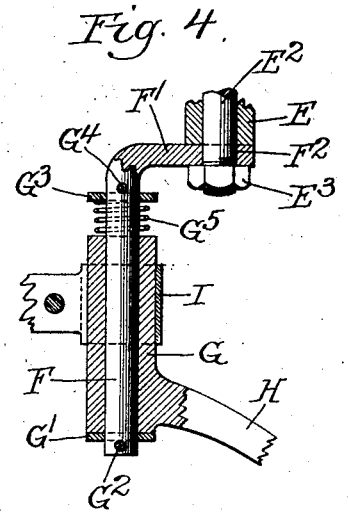
Inventor
George W. Haman
by Parker & Carter
Attorneys Patented Nov. 3, 1925.

1,559,611

UNITED STATES PATENT OFFICE.

GEORGE WALTER HAMAN, OF LA PORTE, INDIANA.

DIRIGIBLE-SPOTLIGHT BRACKET.

Application filed January 30, 1924. Serial No. 689,435.

*To all whom it may concern:*

Be it known that I, GEORGE WALTER HAMAN, a citizen of the United States, residing at La Porte, in the county of La Porte and State of Indiana, have invented a certain new and useful Improvement in Dirigible-Spotlight Brackets, of which the following is a specification.

This invention relates to a dirigible spot light adapted primarily for use with vehicles having stearing gear, and in combination with which the spot light is adapted to be mounted so as to move with movement of the steering gear. One object of the invention is to provide a simple and durable device which may be readily attached to a vehicle. Another object is to provide in such a device a minimum of working parts. Other objects will appear from time to time throughout the specification and claims.

My invention is illustrated more or less diagrammatically in the accompanying drawings, wherein:

Figure 1 is a front view of a portion of the automobile showing my light in position;

Figure 2 is a partial plan view of one wheel and a portion of the steering gear with parts in section, taken generally on line 2—2 of Figure 1;

Figure 3 is a transverse cross section taken on line 3—3 of Figure 1;

Figure 4 is a sectional view showing a portion of Figure 3 on an enlarged scale.

Like parts are designated by like characters throughout.

A is the axle of an automotive vehicle, carrying at either end steering spindles A¹ only one of which is shown. Mounted from this spindle in the usual manner is a wheel B. Extending rearwardly from each of the spindles is a spindle arm A². These are joined by a spindle connecting rod C.

Mounted above the axle by any suitable means is a chassis and frame generally designated by the letter D. As is customary this frame will be suspended from the running gear by means of springs, but the details of this suspension are not shown as they form no part of the present invention.

My light may be fastened to the vehicle in any suitable manner, but as shown it is fastened to the light bracket which is already on the automobile. Thus there is on the vehicle as shown generally in Figure 1 and in detail in the other figures, a light holding bracket E from which one of the usual headlights E¹ is supported by means of the rod E². Extending downwardly beneath the bracket E is the lower end of the member E². This end is threaded and adapted to receive a nut E³.

F is a shaft generally vertical and provided with a laterally bent portion F¹ which is perforated adjacent its end as at F². This perforation overlies the lower end of the member E² and by means of it the shaft F is mounted on the vehicle and is held in position by the nut E³. Mounted for rotation on the shaft F is a generally cylindrical portion G which is held against excessive vertical displacement on the shaft by means of the washer G¹ and the cotter-pin G² at the lower end of the shaft, and the washer G³ and the cotter-pin G⁴ at the upper end of the shaft. Between the washer G³ and the upper end of the cylindrical portion G is a spring G⁵. The spring permits some vertical play and prevents excessive rattling and vibration of the parts.

Extending generally downwardly and rearwardly from the cylindrical portion G is a bracket H. This bracket carries at its lower end a pair of springs H¹ H¹, each of which has at its outer end a clamp H². The clamp H² is adapted to be fitted over the spindle connecting rod C and to be tightened thereupon. By means of this connection and the spring H¹, lateral movement of the spindle connecting rod will cause swinging movement of the arm H.

Attached to the cylindrical portion G by any suitable attaching means I is a light J to which lighting current is conducted by means of a conduit J¹. As here shown the attaching means I permits of considerable adjustment of the position of the light J with respect to the part G. The light may be attached to the part G in any suitable manner and any light may be attached thereto. The details of the attachment of the light and type of light itself form no particular part of the present invention.

Although I have shown an operative device, still it will be obvious that many changes in size, shape and arrangement of parts might be made without departing materially from the spirit of my invention; and I wish therefore that my showing be taken as in a sense diagrammatic.

The use and operation of my invention are as follows:

The parts are assembled as shown with a light fastened to the cylindrical portion G, and the springs which communicate with the rearwardly extending controlling arm are fastened to the steering spindle connecting rod. Any movement of the steering gear will, of course, move the connecting rod laterally; and thus through the yielding connection and the springs will move the bracket arm and rotate it to cause movement of the light and thus the light is automatically and positively moved in response to movement of the steering gear. Thus the light follows the track of the wheels and points in the direction in which they point whatever the direction of movement of the vehicle.

I claim:

1. In combination with a vehicle having a steering gear and supporting frame, a movable light mounting supported from said vehicle and including a base mounted on said vehicle, and a lamp carrying portion mounted for rotation on said base and provided with a lever arm, springs attached to said lever arm and directly a portion of the steering gear, whereby said lamp carrying portion is moved with the movement of said steering gear said springs forming the entire connection between said steering gear and said lever arm.

2. In combination with a vehicle having a steering gear and a frame, a movable light mounting on said frame including a generally vertical shaft rigidly mounted thereon and a generally cylindrical lamp carrying portion mounted for rotation on said shaft and provided with a downwardly and rearwardly extending lever arm, springs attached to said lever arm and to a portion of the steering gear of said vehicle whereby said lamp carrying portion is moved with the movement of said steering gear said springs forming the entire connection between said steering gear and said lever arm.

3. In combination with a vehicle having a steering gear and a frame, a movable light mounting on said frame including a generally vertical shaft rigidly mounted thereon and a generally cylindrical lamp carrying portion mounted for rotation on said shaft and provided with a downwardly and rearwardly extending lever arm, springs attached to said lever arm and to a portion of the steering gear of said vehicle said springs forming the entire connection between said steering gear and said lever arm, there being adjustable attachments for springs on the steering gear and an anti-rattling spring on the vertical shaft, bearing upon the lamp carrying portion and adapted to take up looseness and prevent rattling of the parts.

Signed at La Porte, county of La Porte and State of Indiana, this 25th day of January, 1924.

GEORGE WALTER HAMAN.